June 10, 1958 W. P. STEVENS 2,838,190
HAND TRUCK
Filed Aug. 30, 1956 3 Sheets-Sheet 1
Fig. 1.
Fig. 6.
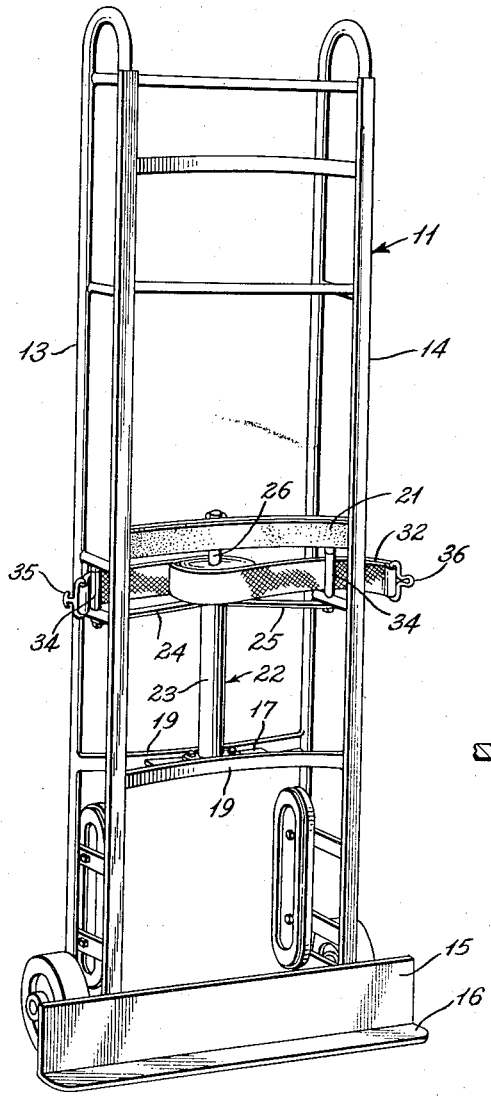
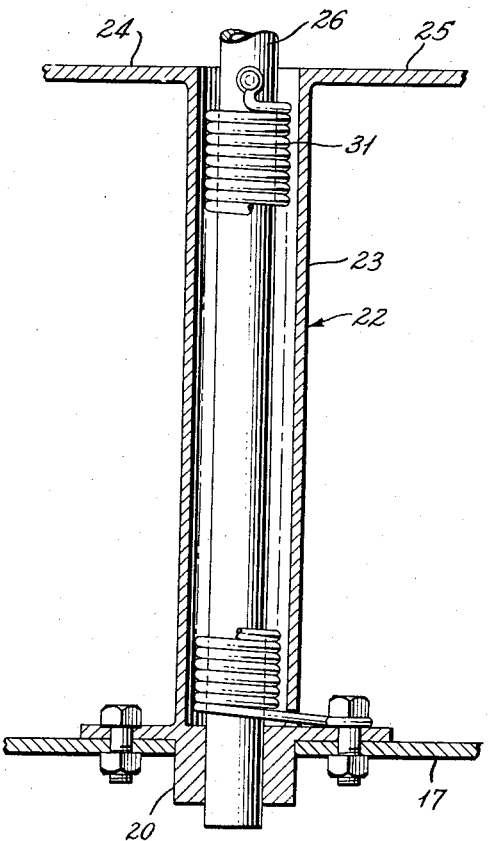
INVENTOR
William P. Stevens
BY
ATTORNEYS

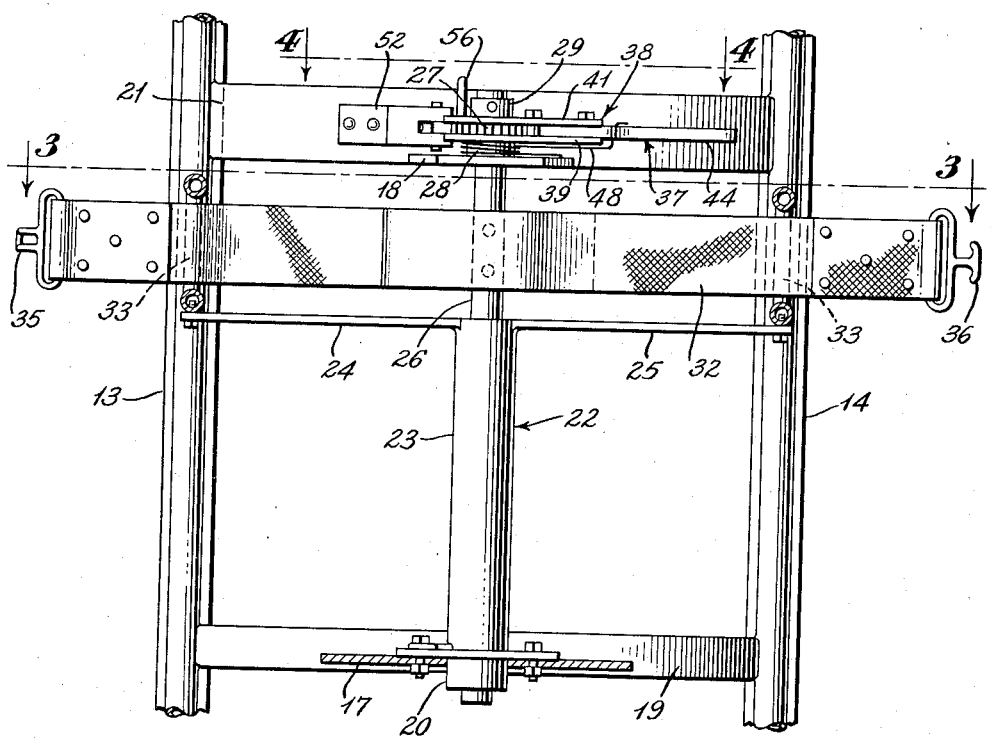
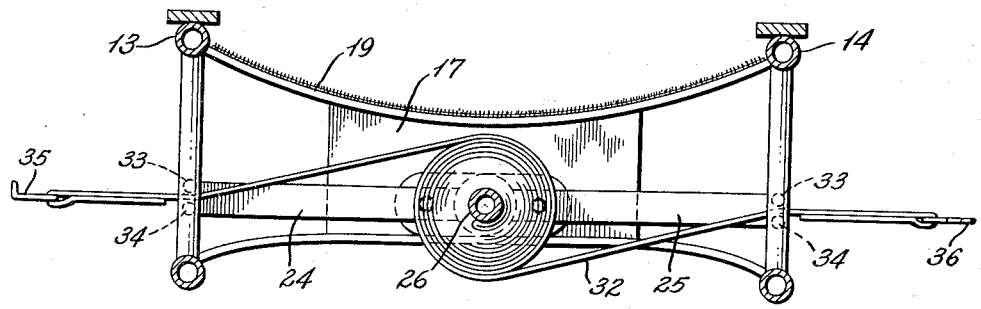

June 10, 1958   W. P. STEVENS   2,838,190
HAND TRUCK
Filed Aug. 30, 1956   3 Sheets-Sheet 3

INVENTOR
William P. Stevens

BY
Burns, Doane, Benedict & Irons
ATTORNEYS

United States Patent Office 2,838,190
Patented June 10, 1958

2,838,190

HAND TRUCK

William P. Stevens, Augusta, Ga.

Application August 30, 1956, Serial No. 607,072

5 Claims. (Cl. 214—374)

This invention relates generally to appliance trucks and, more particularly, to hand-operated appliance trucks having cargo-retaining means.

Hand trucks of the two-wheeled, up-right type are commonly used for the transportation about warehouse floors and the like of heavy appliances such as refrigerators, washing machines, stoves and similar items. Some such trucks as disclosed in applicant's prior Patents Nos. 2,214,311 and 2,301,341 are designed to permit movement on stairways. There is a constant danger that the transported article will be displaced during the repeated tilting movements which take place especially during loading and unloading operations and while ascending or descending stairways. Large articles, such as refrigerators, are especially susceptible of displacement.

Some prior art devices have embodied retaining straps to prevent cargo displacement and this invention resides in certain improvements over such devices.

It is a general object of this invention to provide a hand truck of the up-right, two-wheeled type with improved retaining means to prevent accidental displacement of cargo from the truck.

It is a more specific object of this invention to provide an improved hand truck having a cargo retaining strap with an efficient, compact, easily installed and economical spring winding, cinching and holding means for the strap.

Broadly stated, the invention resides in a hand truck comprising a frame for supporting an article to be transported by the truck, a roller rotatably mounted on the frame, strap means attached to the roller and adapted to form an article-engaging loop, a coil spring connected between the roller and the frame to impart rotation to the roller in a direction so as to wind the strap means therearound and tighten the article-engaging loop, pawl and ratchet means operatively connected to the roller for imparting additional rotation thereto in the same direction to further tighten the article-engaging loop of the strap means, and stop means to prevent unwinding of the strap means by holding the roller against rotation in the opposite direction while the pawl and ratchet means are disengaged.

The stated objects and others will become more apparent from the description of the specific embodiments completely described hereinafter and illustrated on the drawings in which:

Figure 1 is a perspective view of an appliance truck according to the invention;

Figure 2 is a fragmentary vertical sectional view illustrating the strap-winding assembly of the invention;

Figure 3 is a horizontal sectional view taken in the direction of the arrows along line 3—3 of Figure 2;

Figure 6 is a fragmentary vertical sectional view showing the spring-powered strap-winding roller of the invention.

Figure 4:
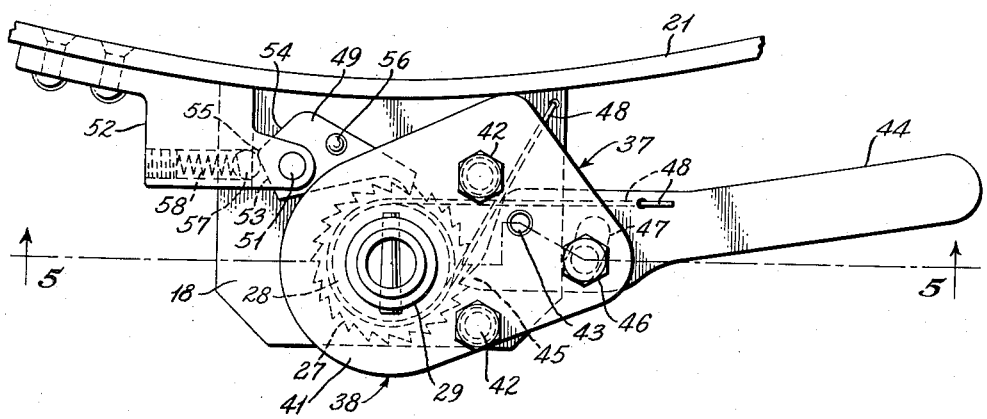
Figure 4 is a fragmentary plan view of the strap cinching and holding mechanism.
Figure 5:
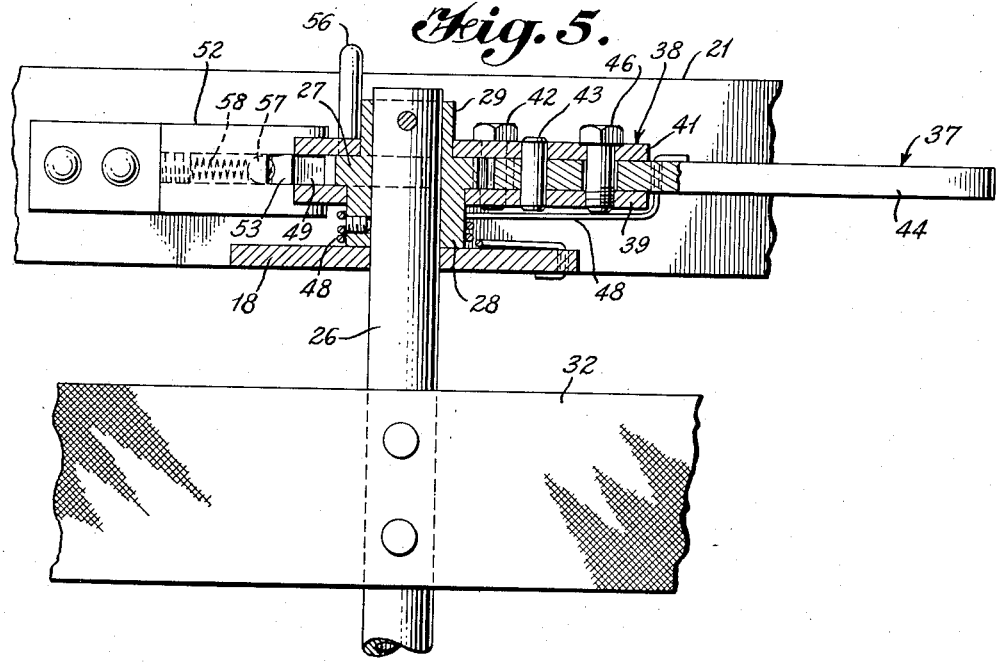
Figure 5 is a fragmentary vertical sectional view taken in the direction of the arrows along the line 5—5 of Figure 4.

There is illustrated in Figure 1 an appliance truck which includes a frame designated generally by the reference numeral 11. The frame 11 comprises a pair of side members 13 and 14 connected together by a plurality of lateral bracing members and an end plate 15 having an outwardly extending flange 16 for supporting an article to be transported by the appliance truck. Mounted on brackets 17 and 18 carried by lateral bracing members 19 and 21 is a strap-winding assembly designated generally by the reference numeral 22. A cylindrical strap roller housing 23 is bolted to bracket 17 and to side members 13 and 14 by means of lateral extensions 24 and 25. Journaled in bearing 20 at the lower end of housing 23 is one end of a strap roller 26, the other end of which extends through an opening in bracket 18. Rigidly mounted on the upwardly protruding end of strap roller 26 is a ratchet wheel 27 provided with a pair of cylindrical bosses 28 and 29. As illustrated in Figure 6, a coil spring 31 surrounds strap roller 26 within strap roller housing 23. One end of spring 31 is fixed to strap roller 26 and the other end is fixed to bracket 17. A cargo tie-down strap 32 is attached at its mid-point to strap roller 26. The inner portions of the two halves of the strap are wound around strap roller 26 in the same direction and overlying each other. If desired, two straps may be used with their inner ends attached to strap roller 26 to enable the two straps to be wound around the strap roller 26 as above described. The outer portions of strap 32 extend between a pair of closely spaced preferably rotatable rods 33 and 34 in side members 13 and 14. Attached to the outer ends of the strap are buckle elements 35 and 36.

When an outward force is applied to outer ends of strap 32, rotation is imparted to strap roller 26 and the strap begins to unwind therefrom. This rotation is resisted by the action of spring 31. The strap 32 may be extended in the form of a loop around an article mounted on the appliance truck and resting against the frame 11 and the buckle elements 35 and 36 are engaged. Spring 31 imparts rotary movement to roller 26 in such a direction as to wind the strap 32 therearound and thus tighten the loop about the article of cargo.

There is also provided a strap-cinching mechanism designated generally by the reference numeral 37 to further tighten the strap around the article of cargo after all of the slack in the strap loop has been taken up by the action of spring 31. A rotary member 38 is provided by a pair of spaced plates 39 and 41 journaled respectively on bosses 28 and 29 of ratchet wheel 27 and secured together by means of bolts 42. Pivotally mounted on pin 43 between the spaced plates 39 and 41 is a lever 44, one end of which provides a pawl 45 for releasably engaging ratchet wheel 27. A pin 46 extending between plates 39 and 41 and through an arcuate slot 47 in lever 44 limits the amount of rotation which may be imparted to lever 44. Lever 44 is normally biased in a counter-clockwise direction to a position where the pawl 45 is disengaged from ratchet wheel 27 by means of coil spring 48 which is wound around boss 28 and the opposite ends of which are attached to bracket 18 and lever 44.

To prevent unwinding of the strap when pawl 45 is disengaged from ratchet wheel 27, an additional pawl 49 releasably engages ratchet wheel 27. Pawl 49 is pivoted about a pin 51 in bracket 52 mounted on lateral bracing member 21. On the end of pawl 49 opposite to the ratchet-engaging end, a pair of oppositely inclined surfaces 53 and 54 intersect to form a nose 55. Pawl 49 may be moved into and out of an operative ratchet-engaging position by means of handle 56. Ball 57, biased outwardly by spring 58, engages the inclined surfaces 53 and 54 to retain the pawl in operative and inoperative positions respectively.

In order to tighten the loop of strap 32 around the article of cargo, the lever 44 is grasped by the operator and rotated clockwise about the pin 43, thus engaging the pawl 45 with ratchet wheel 27. Further rotation will impart rotary movement to the rotary member 37, ratchet wheel 27 and strap roller 26 to wind the strap 32 around the latter. When the lever 44 is released, it is moved in a counterclockwise direction by the action of spring 48 to disengage the pawl 45 from ratchet wheel 27. The strap loop may be cinched as tightly as desired around the article of cargo by repeated oscillation of lever 44 by the operator. Unwinding of the strap loop during the period when pawl 45 is disengaged from ratchet wheel 27 is prevented by the engagement with the latter of pawl 49.

It will be readily perceived that applicant has provided an extremely efficient, compact, easily installed and economical strap-winding assembly for use in connection with an appliance truck. The strap may be looped around an article of cargo and slack is automatically taken up by the action of the spring 31. The strap loop may then be tightly cinched around the article by the cinching mechanism 37 and held in this position by pawl 49. When the truck is not in use, the pawls 45 and 49 may be disengaged whereupon the strap roller 26 may be rotated by the spring 31 to coil the strap 32 therearound to a maximum extent. Thus, the strap is maintained for storage purposes in a coil which presents a neat appearance and serves to keep the strap from being damaged.

There has been illustrated and described what is considered to be the preferred embodiment of the invention. It will be understood, however, that various modifications may be made without departing from the broader scope of the invention as set forth in the following claims:

1. A hand truck comprising a frame for supporting an article to be transported by said truck, a roller rotatably mounted on said frame, strap means attached to said roller and adapted to form an article-engaging loop, a spring connected between said frame and said roller to rotate said roller in a first direction so as to wind said strap means therearound and tighten the article-engaging loop, a ratchet wheel rigidly mounted on said roller, a rotatable member mounted with its axis of rotation coincident with the axis of said roller, a pawl movably mounted on said rotatable member for releasably engaging said ratchet wheel and upon rotation of said rotatable member further rotating said roller in said first direction to further tighten the article-engaging loop of said strap means, and stop means to prevent unwinding of said strap means by holding said roller against rotation in a second direction opposite to said first direction while said pawl and ratchet means are disengaged.

2. A hand truck as recited in claim 1 wherein said stop means comprises a pawl pivotally mounted on said frame for releasably engaging said ratchet wheel.

3. A hand truck comprising a frame for supporting an article to be transported by said truck, a roller rotatably mounted on said frame, strap means attached to said roller and adapted to form an article-engaging loop, a coil spring surrounding said roller and connected between said roller and said frame to impart rotation to said roller in a first direction so as to cause said strap means to be wound therearound and tighten the article-engaging loop, a ratchet wheel non-rotatably mounted on said roller, a rotatable member mounted with its axis of rotation coincident with the axis of said roller, a lever pivotally mounted on said rotatable member, one end of said lever providing a pawl for releasably engaging said ratchet wheel upon rotation of said lever, further rotation of said lever imparting rotation to said rotatable member and roller in the first direction to further tighten the article-engaging loop of said strap means, and stop means to prevent unwinding of said strap means by holding said roller against rotation in a second direction opposite to said first direction while said pawl and ratchet wheel are disengaged.

4. A hand truck as recited in claim 3 wherein said stop means comprises a pawl pivotally mounted on said frame for releasably engaging said ratchet wheel.

5. A hand truck as recited in claim 3 wherein a resilient means is connected to said lever to impart rotation thereto in a direction so as to disengage said pawl and ratchet wheel.

References Cited in the file of this patent
UNITED STATES PATENTS

| | | |
|---|---|---|
| 730,868 | Brown | June 16, 1903 |
| 2,165,603 | Yeats | July 11, 1939 |
| 2,623,760 | Fornelius | Dec. 30, 1952 |
| 2,775,463 | Chenette | Dec. 25, 1956 |